(12) United States Patent
Tanaka

(10) Patent No.: US 10,546,380 B2
(45) Date of Patent: Jan. 28, 2020

(54) CALIBRATION DEVICE, CALIBRATION METHOD, AND NON-TRANSITORY COMPUTER-READABLE STORAGE MEDIUM FOR THE SAME

(71) Applicant: DENSO CORPORATION, Kariya, Aichi-pref. (JP)

(72) Inventor: Hitoshi Tanaka, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 172 days.

(21) Appl. No.: 15/749,908

(22) PCT Filed: Jul. 15, 2016

(86) PCT No.: PCT/JP2016/070939
§ 371 (c)(1),
(2) Date: Feb. 2, 2018

(87) PCT Pub. No.: WO2017/022452
PCT Pub. Date: Feb. 9, 2017

(65) Prior Publication Data
US 2018/0232893 A1    Aug. 16, 2018

(30) Foreign Application Priority Data

Aug. 5, 2015  (JP) ................................ 2015-155037

(51) Int. Cl.
*G06T 7/00*    (2017.01)
*G06T 7/292*   (2017.01)
(Continued)

(52) U.S. Cl.
CPC ............... *G06T 7/292* (2017.01); *B60Q 9/00* (2013.01); *B60R 11/04* (2013.01); *G01P 1/08* (2013.01);
(Continued)

(58) Field of Classification Search
CPC .......... H01L 27/092; H01L 21/823814; H01L 27/0207; H03F 3/165; H03F 1/086; H03F 3/04; H03F 3/45179; H03F 2203/45246
(Continued)

(56) References Cited

U.S. PATENT DOCUMENTS

2007/0229238 A1\* 10/2007 Boyles ............... G06K 9/00369
340/435
2008/0122597 A1\* 5/2008 Englander ................ B60Q 1/24
340/433
(Continued)

FOREIGN PATENT DOCUMENTS

JP          2014-48803 A      3/2014

*Primary Examiner* — Jerome Grant, II
(74) *Attorney, Agent, or Firm* — Knobbe, Martens, Olson & Bear, LLP

(57) ABSTRACT

A calibration device acquires an image of an imaging target located ahead of a vehicle. Images of the imaging targets behind the vehicle are acquired, which are different from the acquired images captured in the forward direction. The shape and size of the imaging targets are already known. The calibration device performs projective transformation for the imaging targets shown in overlap regions of the acquired images, and identifies a roll, a pitch and a vertical position of each camera such that the conversion results are in agreement with the shape and size of the targets. The calibration device identifies an x-coordinate, a y-coordinate, and a yaw of each camera such that one link angle in a virtual link structure is minimized.

9 Claims, 8 Drawing Sheets

(51) Int. Cl.
*G06T 7/80* (2017.01)
*B60Q 9/00* (2006.01)
*B60R 11/04* (2006.01)
*G01P 1/08* (2006.01)
*G01P 3/00* (2006.01)
*G06K 9/00* (2006.01)
*H04N 5/247* (2006.01)

(52) U.S. Cl.
CPC ............ *G01P 3/00* (2013.01); *G06K 9/00791* (2013.01); *G06T 7/80* (2017.01); *H04N 5/247* (2013.01); *G06T 2207/10028* (2013.01); *G06T 2207/30252* (2013.01)

(58) Field of Classification Search
USPC .......................................................... 382/103
See application file for complete search history.

(56) References Cited

U.S. PATENT DOCUMENTS

| | | |
|---|---|---|
| 2011/0115922 A1 | 5/2011 | Shimizu |
| 2012/0154586 A1* | 6/2012 | Chung ............... H04N 5/23238 348/148 |
| 2014/0098229 A1* | 4/2014 | Lu ........................... H04N 7/181 348/148 |
| 2014/0247352 A1* | 9/2014 | Rathi ....................... B60R 1/00 348/148 |
| 2015/0208041 A1 | 7/2015 | Wang et al. |
| 2016/0165148 A1* | 6/2016 | Itoh .................... H04N 5/23238 348/148 |
| 2016/0191795 A1* | 6/2016 | Han ...................... G06T 3/4038 348/36 |
| 2016/0217625 A1* | 7/2016 | Oba ....................... G06T 3/4038 |
| 2016/0236619 A1 | 8/2016 | Tanaka et al. |
| 2017/0066375 A1* | 3/2017 | Kato ......................... H04N 7/181 |

* cited by examiner

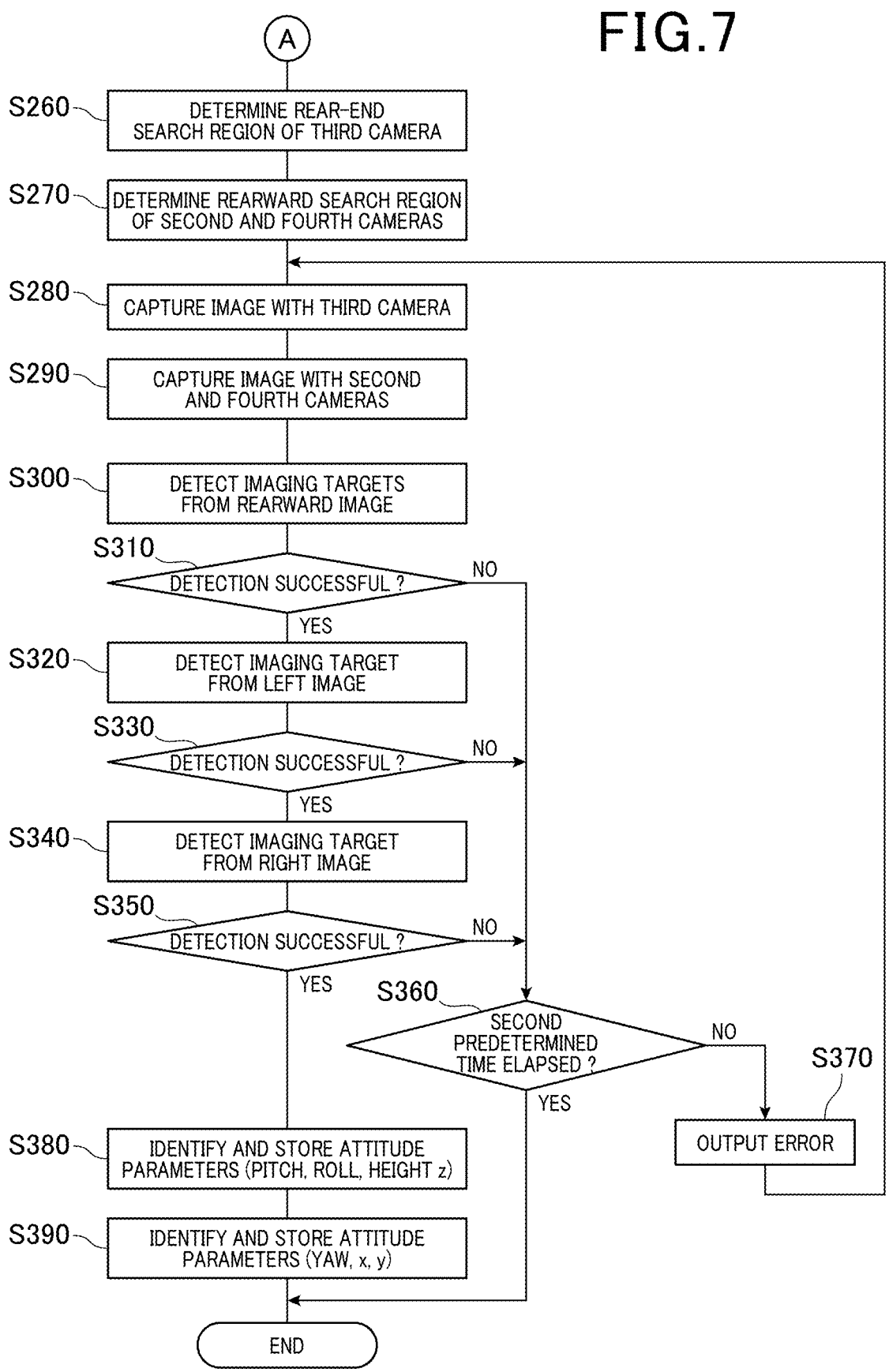

CALIBRATION DEVICE, CALIBRATION METHOD, AND NON-TRANSITORY COMPUTER-READABLE STORAGE MEDIUM FOR THE SAME

This application is based on and claims the benefit of priority from earlier Japanese Patent Application No. 2015-155037 filed on Aug. 5, 2015, the description of which is incorporated herein by reference.

TECHNICAL FIELD

The present disclosure relates to a technique for deriving attitude parameters of cameras mounted to a vehicle.

BACKGROUND ART

Calibration devices based on conventional art are well known to be used for calibration for deriving attitude parameters of a camera mounted to an automobile (see PLT1).

The calibration device described in PLT 1 performs bird's eye view conversion for a given calibration target shown in a captured image. This calibration device searches and identifies a roll (rotation about the longitudinal axis), a pitch (rotation about the lateral axis), and a vertical position of the camera, which bring about conversion results that are most approximate to the shape and size of the actual target. The given calibration target herein refers to an object to be imaged having a given shape and size and disposed at a predetermined position.

The calibration device acquires a vehicle speed and a rotation angle from a vehicle speed sensor for detecting a speed of the own vehicle, and a rotation angle sensor for detecting a rotation angle of the own vehicle about an axis perpendicular to the horizontal plane. The calibration device uses the acquired vehicle speed and rotation angle as a basis to search and identify an x-coordinate, a y-coordinate, and a yaw (rotation about a vertical axis), which minimize the positional difference and the rotational difference of a fixed object shown in images captured at different points.

CITATION LIST

Patent Literature

[PLT 1] JP 2014-48803 A

SUMMARY OF THE INVENTION

Technical Problem

The calibration device described in PLT 1 has to acquire the vehicle speed and the rotation angle of the own vehicle from the vehicle speed sensor and the rotation angle sensor mounted to the own vehicle to identify the x-coordinate, the y-coordinate, and the yaw among attitude parameters.

Calibration is usually carried out during a manufacturing stage of vehicles or during a maintenance stage at car dealers. In such workplaces in particular, degrees of freedom in the sequence of mounting vehicle devices are desired to be enhanced to improve working efficiency. Thus, the vehicle speed sensor or the rotation angle sensor is not necessarily mounted to the vehicle by the time of conducting calibration.

In the absence of such a sensor, the calibration device described in PLT 1 cannot carry out calibration. That is, degrees of freedom for conducting calibration are desired to be enhanced in the technique of deriving attitude parameters of a camera.

An object of the present disclosure is to further enhance degrees of freedom for conducting calibration, in the technique of deriving attitude parameters of a camera.

Solution to Problem

The present disclosure relates to a calibration device (20) identifying attitude parameters of each of a plurality of cameras (10) mounted to a vehicle.

The plurality of cameras are mounted to the vehicle so as to capture images of specified regions different from each other and defined around the vehicle, each specified region having overlap regions where the specified region partially overlaps with another specified region. The plurality of cameras include a first camera (10A) capturing an image of a forward direction of the vehicle, a second camera (10B) capturing an image of a rightward direction of the vehicle, a third camera (10C) capturing an image of a rearward direction of the vehicle, and a fourth camera (10D) capturing an image of a leftward direction of the vehicle.

The calibration device of the present disclosure includes an image acquisition unit (20, S140 to S370), a first identification unit (20, S380), and a second identification unit (20, S390).

The image acquisition unit acquires images captured by the plurality of cameras. The first identification unit performs projective transformation for the imaging targets shown in the overlap regions of each image acquired by the image acquisition unit and identifies a roll, a pitch and a vertical position among the attitude parameters of each of the plurality of cameras.

The imaging targets each have a given shape and size. The roll represents a rotation angle of each camera about the lens center axis. The pitch represents a rotation angle of each camera about the horizontal axis. The vertical position corresponds to a coordinate in a height direction of the vehicle.

The second identification unit identifies an x-coordinate, a y-coordinate and a yaw among the attitude parameters of each of the plurality of cameras so that one link angle of a virtual link structure is minimized.

The virtual structure is formed of line segments serving as links. The virtual structure is virtually connecting representative points of the imaging targets shown in the images acquired by the image acquisition unit, with the representative points of the imaging targets located at the same position and shown in the overlap regions of different images being permitted to coincide with each other. The x-coordinate is a coordinate in the longitudinal direction of the vehicle. The y-coordinate is a coordinate in the lateral direction of the vehicle. The yaw represents a rotation angle of the vehicle about an axis perpendicular to the horizontal plane.

The image acquisition unit includes a first acquisition unit (20, S160, S170) and a second acquisition unit (20, S280, S290).

The first acquisition unit acquires images of the imaging targets ahead of the vehicle captured by the first camera, the second camera, and the fourth camera.

The second acquisition unit acquires images of the imaging targets behind the vehicle captured by the second camera, the third camera, and the fourth camera, these images being different from the images acquired by the first acquisition unit.

The first identification unit and the second identification unit use images acquired by the first acquisition unit and images acquired by the second acquisition unit, as images acquired by the image acquisition unit to identify attitude parameters of each of the plurality of cameras.

In the calibration device of this configuration, information used for identifying the x-coordinate, the y-coordinate, and the yaw among attitude parameters of the cameras is derived from the images captured by the cameras. Other information, such as the speed or the rotation angle of the vehicle, is not used.

That is, in the calibration device of the present disclosure, calibration can be carried out in the absence of a vehicle sensor or rotation angle sensor from the vehicle. Thus, the technique of the present disclosure further enhances degrees of freedom of calibration in the technique of deriving attitude parameters of the cameras.

In the technique of the present disclosure, the images used for identifying attitude parameters (images from the plurality of cameras) may be captured through the following method. For example, the images of the targets ahead of the vehicle may be captured by the first, second and fourth cameras in a state where the vehicle is stationary. Also, after the targets ahead of the vehicle move to behind the vehicle, the images of the targets behind the vehicle may be captured by the second, third and fourth cameras in a state where the vehicle is stationary.

Thus, according to the technique of the present disclosure, use of the aforementioned method of acquiring images for use in identifying attitude parameters can minimize the area of the working range (the size of the work space) for identifying attitude parameters. This way of image capture according to the technique of the present disclosure can readily ensure a work space used for identifying the attitude parameters of the cameras during a manufacturing stage of the vehicle or during a maintenance stage at the car dealers.

The mode of the technique according to the present disclosure is not limited to the calibration device. Specifically, the technique according to the present disclosure may be implemented in the form of a calibration method of identifying attitude parameters of cameras, or in the form of a program executed by a computer mounted to the vehicle.

The calibration method as a technical mode of the present disclosure may achieve the advantageous effects described above similarly to the calibration device. The program as a technical mode of the present disclosure can be loaded on a computer from a storage medium, as necessary, and started. This program may be retrieved via a communication line for download it onto a computer and started. This program can cause a computer to execute a predetermined processing procedure and to function as the calibration device.

For example, the storage medium may be a computer-readable storage medium, such as DVD-ROM, CD-ROM or a hard disc.

The bracketed reference signs shown in [Solution to Problem] indicate correspondency to the specific means described in the embodiment set forth below as a technical mode of the present disclosure. Accordingly, the reference signs should not limit the technical scope of the present disclosure.

BRIEF DESCRIPTION OF THE DRAWINGS

FIG. 7 is a flowchart illustrating calibration.

DESCRIPTION OF THE EMBODIMENTS

With reference to the drawings, an embodiment as a technical mode of the present disclosure will be described.

First Embodiment

<Calibration System>

Figure 1:
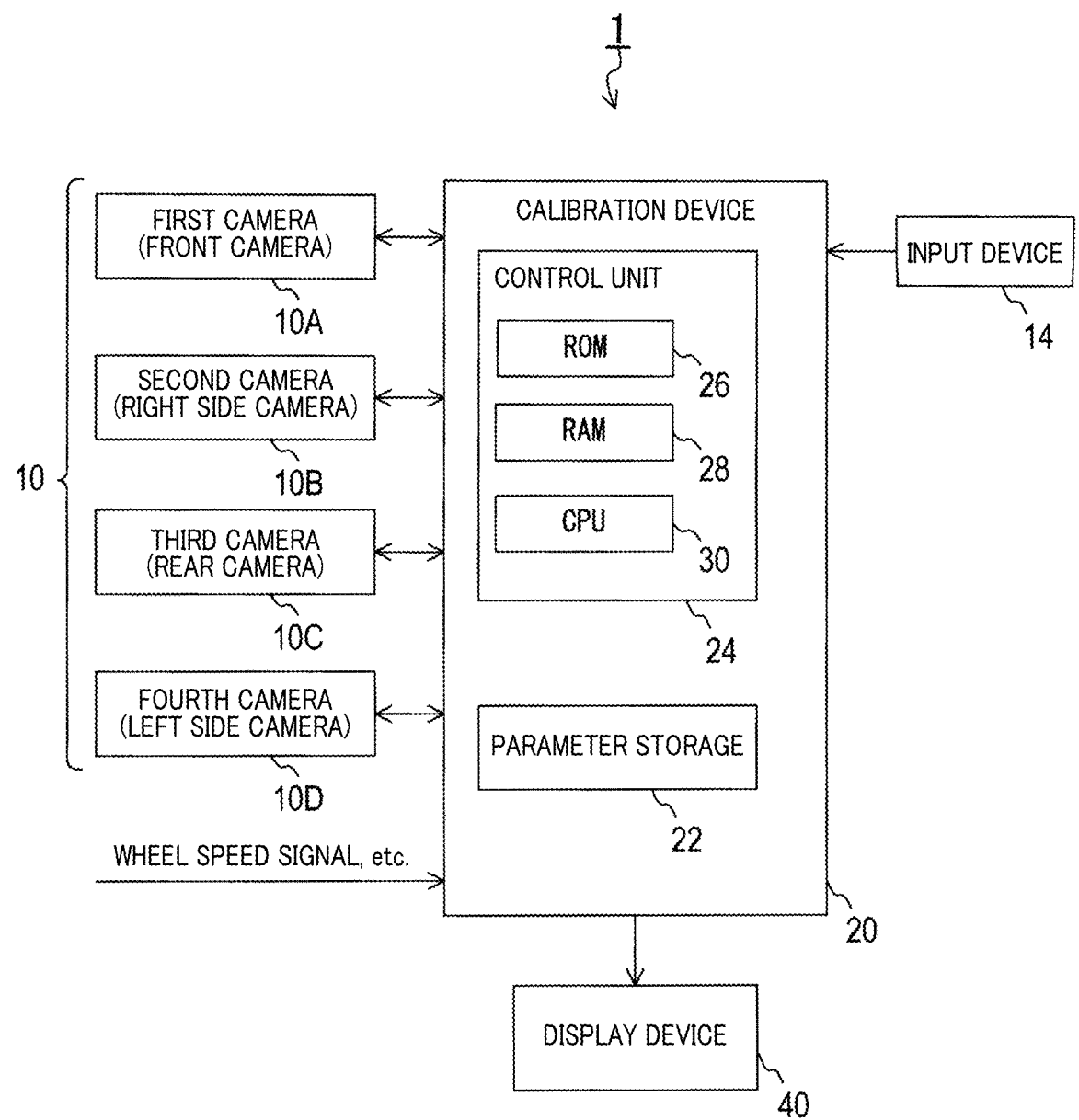
FIG. 1 is a schematic block diagram illustrating a calibration system.
Figure 2:
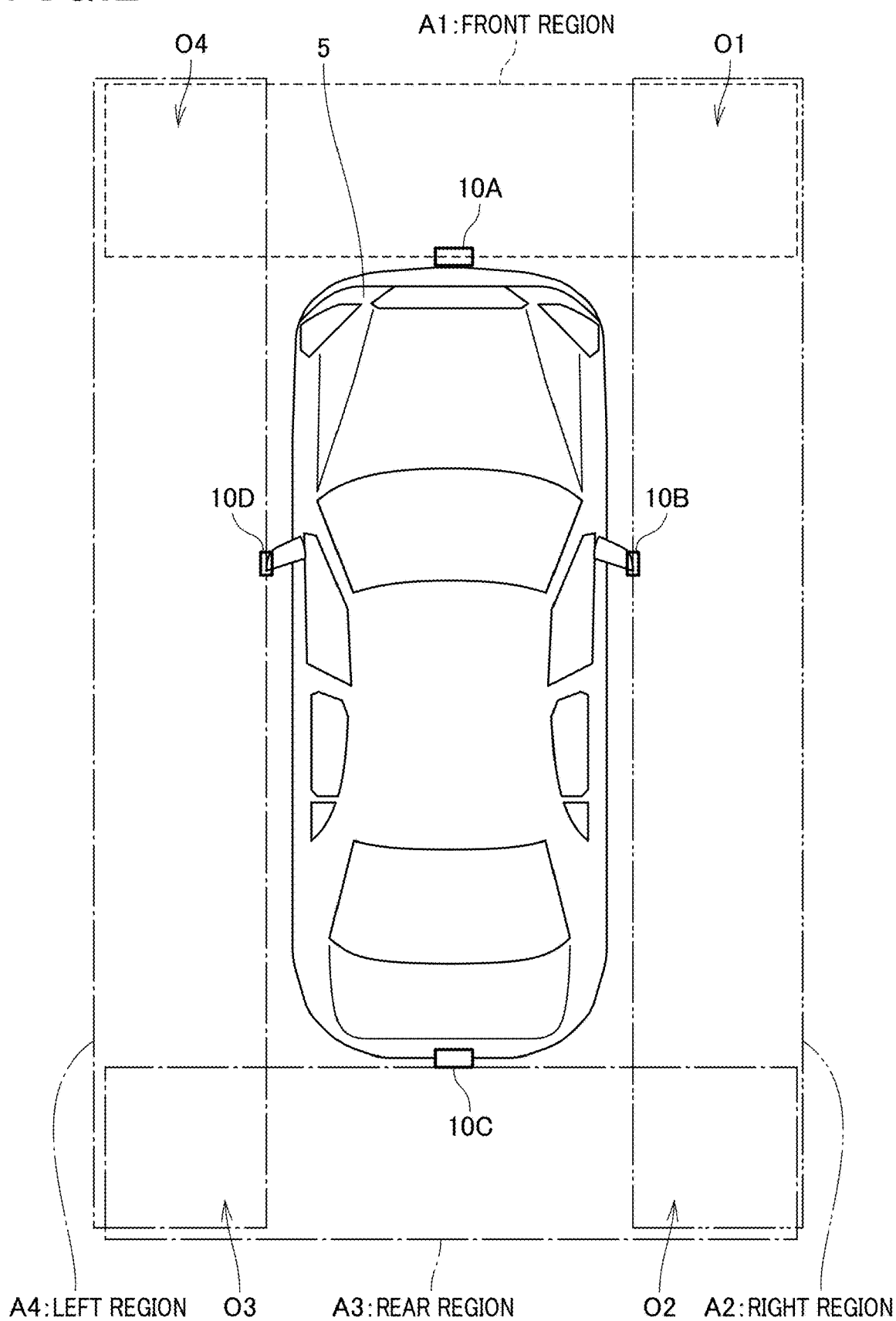
FIG. 2 is a diagram illustrating a layout and imaging ranges of cameras.

FIG. 1 shows a calibration system 1 according to the present embodiment for identifying attitude parameters of each of a plurality of cameras 10 mounted to a vehicle 5 (See FIG. 2). The vehicle 5 according to the present embodiment is an automobile.

The calibration system 1 includes the plurality of cameras 10, an input device 14, a calibration device 20, and a display device 40. The plurality of cameras 10 each capture an image, via a wide-angle lens, in specified regions around the vehicle 5. The wide-angle lens has a large field angle (for example, 60 degrees or more) and a short focal length. An example of the wide-angle lens may be a fish-eye lens (for example, a lens with a field angle of 180 degrees or more) or the like.

As shown in FIG. 2, the specified regions are regions A1 to A4 specified around the vehicle 5 and different from each other. These specified regions include regions O1 to O4 where the specified regions partially overlap each other (hereinafter is referred to as "overlap region(s)").

In the present embodiment, the plurality of cameras 10 include a first camera 10A, a second camera 10B, a third camera 10C, and a fourth camera 10D.

The first camera 10A (front camera) is set up at a front end of the vehicle 5 so as to capture an image in the region A1 (hereinafter is referred to as "front region A1") specified in a forward direction of the vehicle 5. The second camera 10B (right side camera) is set up on the right side of the vehicle 5 so as to capture an image in the region A2 (hereinafter is referred to as "right region A2") specified on the right side of the vehicle 5. The third camera 10C (rear camera) is set up at a rear end of the vehicle 5 so as to capture an image in the region A3 (hereinafter is referred to as "rear region A3") specified in a rearward direction of the vehicle 5. The fourth camera 10D (left side camera) is set up on the left side of the vehicle 5 so as to capture an image in the region A4 (hereinafter is referred to as "left region A4") specified on the left side of the vehicle 5.

In this way, when the plurality of cameras 10 are set up, the specified regions A1 to A4 include the following overlap regions. Specifically, the front region A1 includes the overlap region O1 overlapping the right region A2, and the overlap region O4 overlapping the left region A4. The right region A2 includes the overlap region O1 overlapping the front region A1, and the overlap region O2 overlapping the rear region A3. The rear region A3 includes the overlap region O2 overlapping the right region A2, and the overlap region O3 overlapping the left region A4. The left region A4 includes the overlap region O3 overlapping the rear region A3, and the overlap region O4 overlapping the front region A1.

The input device 14 receives an input of information via an interface. In the present embodiment, the input device 14 includes various types of input devices, such as a keyboard, a pointing device, and a switch. The pointing device may be an input device, such as a touch pad or touch panel, which specifies an input position or a coordinate on a screen.

In the present embodiment, the input device 14 may serve as a diagnostic tool for the calibration device 20. The diagnostic tool transmits or receives information to or from the calibration device 20, and analyzes the information acquired from the calibration device 20 to make a diagnosis such as of malfunction based on the analysis.

The display device 40 displays an image on the screen. As an example, the display device 40 may be a liquid crystal display or the like.

<Calibration Device>

The calibration device 20 executes calibration, based on images captured by the plurality of cameras 10. Specifically, the calibration device 20 identifies the attitude parameters of the cameras 10A to 10D, based on the captured images. The calibration device 20 includes a parameter storage 22 and a control unit 24.

The parameter storage 22 is a nonvolatile storage. As an example, the parameter storage 22 may be a hard disk drive, a flash memory, or the like.

The parameter storage 22 stores set-up positions of the plurality of cameras 10 in the vehicle space (spatial positions in the vehicle) and various parameters representing set-up attitudes of the cameras 10 (hereinafter, referred to as "attitude parameters").

In the present embodiment, the attitude parameters include x-coordinate, y-coordinate, vertical position z, pitch $\Theta$, roll $\Phi$, and yaw $\Psi$. The x-coordinate is a coordinate in the vehicle space where the cameras 10 are set up, that is, a coordinate in the longitudinal direction (front and back direction) of the vehicle 5. The y-coordinate is a coordinate in the vehicle space where the cameras 10 are set up, that is, a coordinate in the lateral direction (right and left direction) of the vehicle 5. The vertical position z is a coordinate in the vehicle space where the cameras 10 are set up, that is, a coordinate in the height direction (vertical direction) of the vehicle 5.

Pitch $\Theta$ represents a rotation angle of each camera 10 about the horizontal axis. The horizontal axis is parallel to a horizontal plane in the vehicle 5. Roll $\Phi$ represents a rotation angle of each camera 10 about the lens center axis. The lens center axis corresponds to an optical axis expressed by a straight line passing through the centers of the two spherical surfaces. Yaw $\Psi$ represents a rotation angle of each camera 10 about an axis perpendicular to the horizontal plane in the vehicle 5. The axis perpendicular to the horizontal plane is an axis that is perpendicular to a horizontal axis.

The control unit 24 is a device including a microcomputer as a main component which includes memories, such as a ROM 26 and a RAM 28, and a CPU 30. The ROM 26 stores data or programs whose contents are required to be maintained in a state where power is turned off. The RAM 28 stores data whose contents are required to be maintained only temporarily. The CPU 30 executes processes according to programs stored such as in the ROM 26.

The calibration device 20 is connected to wheel speed sensors each detecting a wheel speed of the vehicle 5. The control unit 24 calculates a traveling speed of the vehicle 5, with a well-known calculation means, based on wheel speed signals transmitted from the wheel speed sensors.

The ROM 26 stores a program based on which the control unit 24 executes calibration. In the calibration, attitude parameters of the cameras 10A to 10D are identified, based on the images of an imaging target 50 (see FIGS. 3A and 3B) captured by the plurality of cameras 10.

The ROM 26 stores target information on the shape and size of the targets 50. That is, in the present embodiment, at least two pieces of information on the shape and size of the target 50 are already known.

Figure 3A:
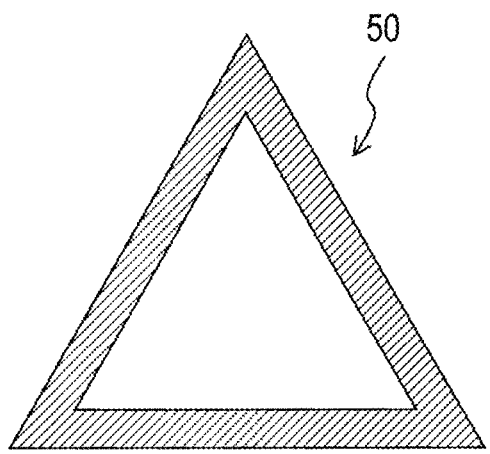
FIG. 3A is a diagram illustrating an example of an imaging target.
Figure 3B:
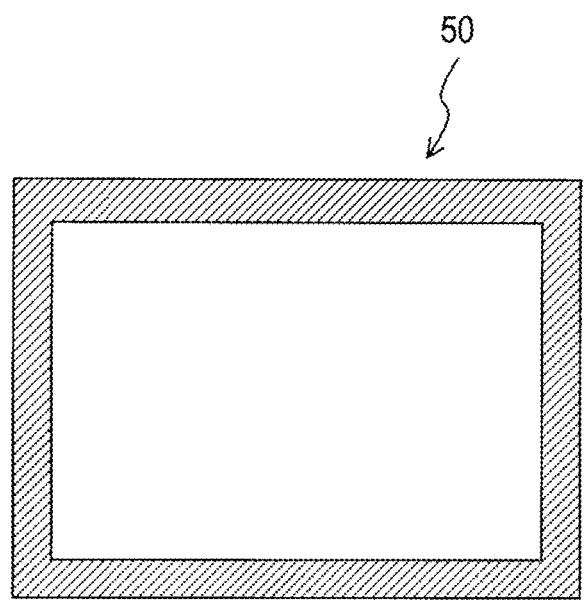
FIG. 3B is a diagram illustrating an example of an imaging target.

In the present embodiment, the target 50 is formed into a polygonal shape having three or more vertices. That is, the target 50 of the present embodiment may be in any shape as long as they are each in a polygonal shape with three or more vertices. Specifically, the target 50 may have a triangular shape as shown in FIG. 3A, or may have a quadrangular shape as shown in FIG. 3B. The target 50 may be in a polygonal shape with five or more vertices.

In the present embodiment, the target 50 serves as a member enabling identification of the vertex coordinates thereof in each image captured by the cameras 10. That is, the target 50 of the present embodiment may be any members as long as the vertices thereof can be identified in a captured image. As illustrated in FIG. 3A or 3B, the target 50 may have a configuration, for example, in which two polygonally shaped plate-like members with a different size and color are concentrically fixed to each other.

In the present embodiment, the target information includes information on the polygonal shape of the target 50 (the number of vertices of the target 50 and a positional relationship between the vertices), the length of each side of the target 50, and the inner angle (or the outer angle) of each vertex of the target 50.

<Calibration>

Startup conditions for calibration according to the present embodiment will be described (preparation before startup).

In the present embodiment, targets 50 are disposed as follows before starting calibration. Specifically, two targets 50 are arranged with a fixed positional relationship. The two targets 50 are arranged so that the distance therebetween is larger than the width of the vehicle 5. For example, the positional relationship of the targets 50 is expressed by the distance therebetween.

In the present embodiment, calibration is started upon reception of a startup command. The startup command is a command for starting calibration. The startup command may be inputted from a diagnostic tool of the input device 14 into the control unit 24 of the calibration device 20, or may be inputted using other methods.

The following description addresses calibration according to the present embodiment after being started.

In the present embodiment, when the calibration is started, the vehicle 5 equipped with the calibration system 1 is disposed as follows. Specifically, the vehicle 5 is allowed to travel passing between the two targets 50 from the position before the two targets 50. In the present embodiment, calibration is executed during the traveling of the vehicle 5, based on the images captured by the plurality of cameras 10.

Figure 4:
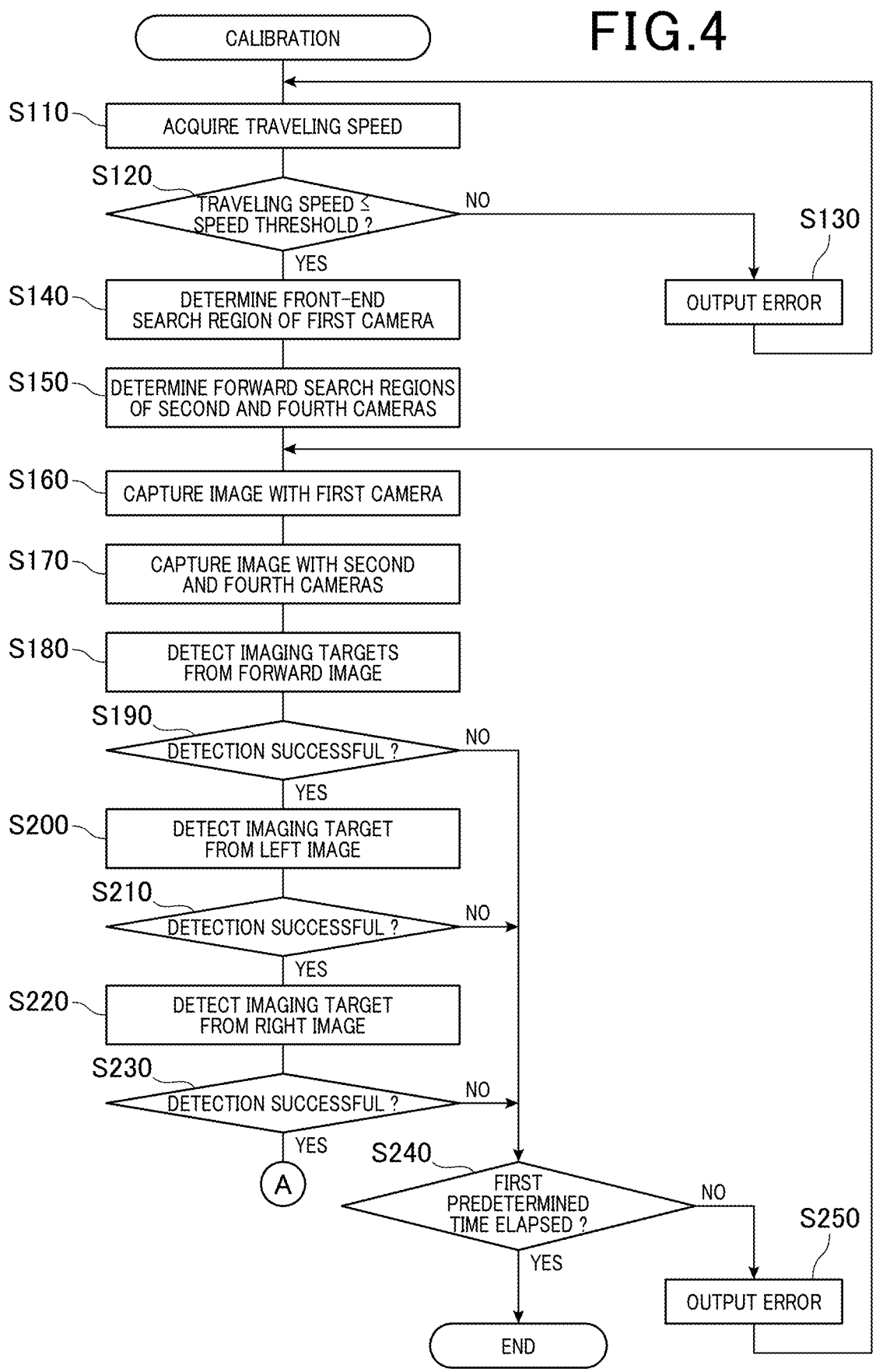
FIG. 4 is a flowchart illustrating calibration.

Specifically, the control unit 24 of the calibration device 20 executes the following processing. As shown in FIG. 4, the control unit 24 acquires the traveling speed of the vehicle 5 (S110). The control unit 24 calculates the traveling speed of the vehicle 5 with a well-known calculation process based on a wheel speed signal transmitted from a wheel speed sensor.

Then, the control unit 24 determines whether the traveling speed acquired at step S110 is not more than a predetermined speed threshold (S120). The speed threshold is a traveling speed indicating a state of the vehicle 5 traveling at low speed, including slowed-down speed. In other words, the speed threshold is a predetermined speed for conducting calibration with accuracy.

If the traveling speed is determined to be greater than the speed threshold (NO at S120), the control unit 24 outputs a first error signal to the display device 40 (S130). The display device 40 then displays predetermined error information based on the first error signal to notify the worker of the occurrence of an error. The first error signal indicates that there is a high probability of impairing calibration accuracy due to the traveling speed being faster than the predetermined speed. The display device 40 displays the predetermined error information, based on the inputted first error signal to notify the worker of the occurrence of an error. Specifically, the display device 40 displays the error information notifying that the traveling speed is faster than the predetermined speed. The display contents of the display device 40 are not limited to what are described above. For example, the display contents may be information for notifying a high probability of impairing calibration accuracy.

The calibration described above corresponds to the processing of identifying attitude parameters of the cameras 10A to 10D. Specifically, the calibration corresponds the processing of steps S380 and S390 described later referring to FIG. 7.

After outputting the first error signal to the display device 40, the control unit 24 executes step S110 again. If the traveling speed is determined to be not more than the speed threshold (YES at S120), the control unit 24 determines a front-end search region in a forward image (hereinafter is referred to as "front-end search region of the first camera 10A") (S140).

Figure 5A:
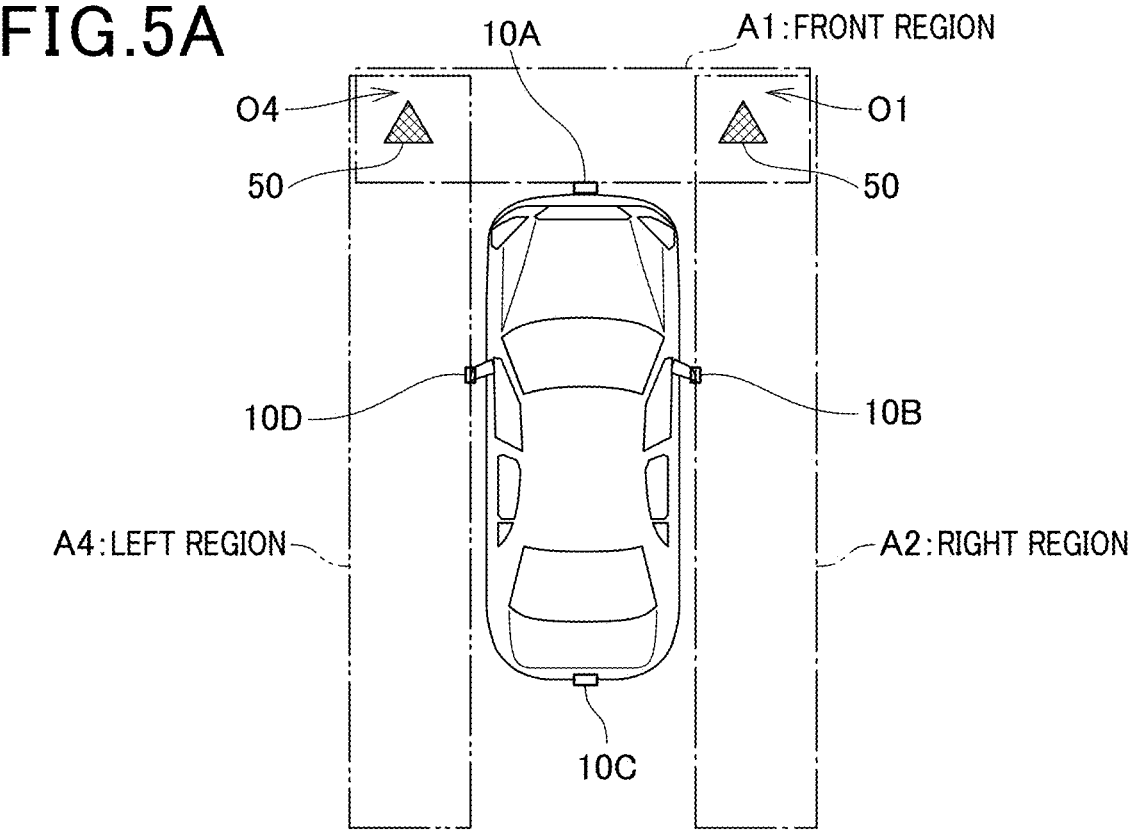
FIG. 5A is a diagram illustrating a situation where an image is captured before the vehicle arrives at a position between two imaging targets.

The forward image is an image of the front region A1, shown in FIG. 5A, captured by the first camera 10A. The front-end search region of the first camera 10A is a region as set forth below. Specifically, before the front end of the vehicle 5 reaches a position between the two targets 50, the first camera 10A captures an image of the front region A1. The front region A1 is a target region in the obtained forward image, for determining whether the targets 50 are shown therein (whether the imaging targets 50 are included therein).

In the present embodiment, the front-end search region of the first camera 10A is provided to each of the right and left ends of the forward image. Specifically, the control unit 24 executes step S140 to determine front-end search regions of the first camera 10A in predetermined areas of the respective overlap regions O1 and O4 where the images captured by the second and fourth cameras 10B and 10D overlap the forward image. That is, the front-end search regions of the first camera 10A determined at step S140 are regions where images of the targets 50 are highly likely to be shown (regions having a high probability of including the targets 50).

Then, the control unit 24 determines forward search regions in a right image and a left image (hereinafter is referred to as "forward search region of the second camera 10B" and "forward search region of the fourth camera 10D") (S150). The right image is an image of the right region A2, shown in FIG. 5A, captured by the second camera 10B. The left image is an image of the left region A4, shown in FIG. 5A, captured by the fourth camera 10D.

The forward search regions of the second and fourth cameras 10B and 10D correspond to the following regions. Before the front end of the vehicle 5 reaches the position between the two targets 50, the second camera 10B captures an image of the right region A2, and the fourth camera 10D captures an image of the left region A4. The right and left regions A2 and A4 correspond to target regions in the obtained right and left images, for determining whether the targets 50 are shown therein.

In the present embodiment, the forward search regions of the second and fourth cameras 10B and 10D are determined to be respective end portions ahead of the vehicle in the right and left images. Specifically, the control unit 24 executes step S150 to determine the forward search regions of the second and fourth cameras 10B and 10D in predetermined areas of the respective overlap regions O1 and O4 where the right and left images each overlap the forward image.

Then, the control unit 24 outputs an imaging command for capturing an image to the first camera 10A (S160). The first camera 10A then captures a forward image according to the imaging command and outputs the captured forward image to the control unit 24.

The control unit 24 outputs the imaging command for capturing an image to the second and fourth cameras 10B and 10D (S170). The second camera 10B then captures a right image according to the imaging command and outputs the captured right image to the control unit 24. Similarly, the fourth camera 10D captures a left image and outputs the captured left image to the control unit 24.

Figure 6A:
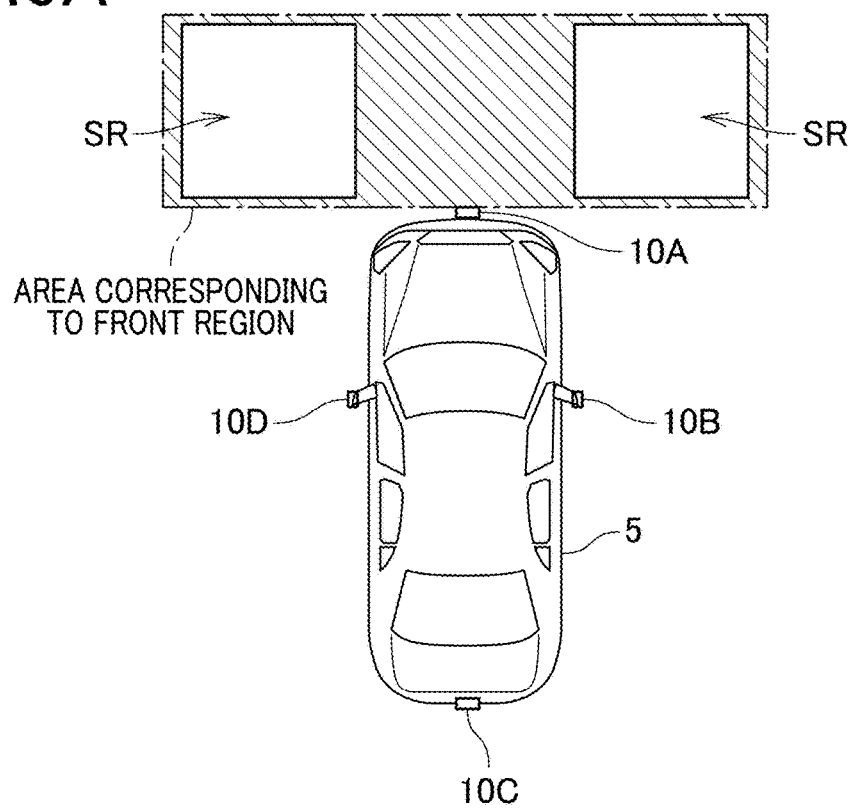
FIG. 6A is a diagram illustrating how a search region is determined.
Figure 6B:
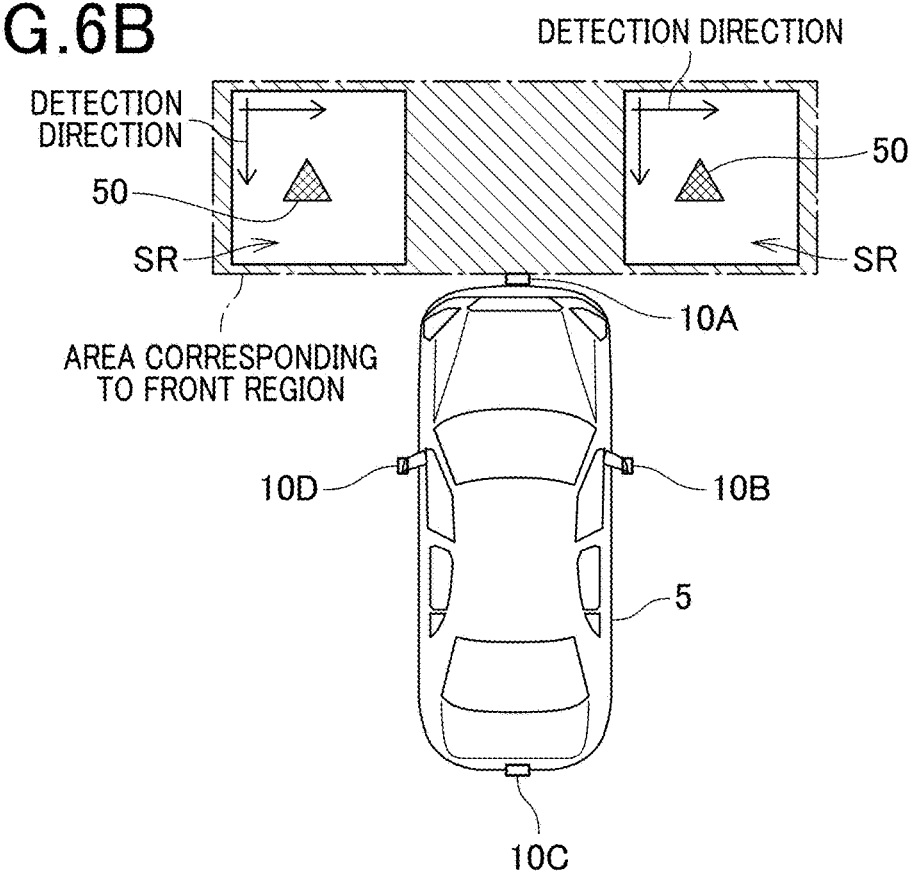
FIG. 6B is a diagram illustrating how an imaging target shown in a search region is searched.

Then, the control unit 24 detects the targets 50 from the front-end search regions (regions provided to right and left end portions) of the first camera 10A, in the forward image captured at step S160 (S180). In the detection, the control unit 24 determines whether the targets 50 are shown in respective front-end search regions SR, as shown in FIG. 6A, of the first camera 10A in the forward image. The determination as to whether images of the targets 50 have been captured may be made by a method shown in FIG. 6B, for example. Specifically, each front-end search region SR of the first camera 10A may be searched in two or more given detection directions to detect the presence of vertices of the target 50. If the positional relationship of the detected vertices agrees with the shape of a target 50, the control unit 24 may determine that an image of the target 50 has been shown in the front-end search region SR of the first camera 10A. If the positional relationship of the detected vertices disagrees with the shape of a target 50, the control unit 24 may determine that no image of the target 50 has been shown in the front-end search region SR of the first camera 10A.

Various known detection methods may be used for the method of detecting vertices in an image of the target 50. Therefore, the detailed descriptions here are omitted. In the present embodiment, for example, a well-known edge detection process is performed in two or more given detection directions. In the edge detection process, a pixel detected as an edge in both detection directions may be determined to be a vertex of a target 50.

A determination as to whether the positional relationship of detected vertices agrees with the shape of a target 50 may be made by the following method. Specifically, a determination may be made as to whether the positions of the vertices agree with the positions of the shape stored as the shape of a target 50. That is, if the positions of the detected vertices are on a straight line, or if the number of the detected vertices is more than the number of vertices of a target 50, the positional relationship of the vertices may be determined to disagree with the shape of the target 50.

The control unit 24 determines whether the targets 50 have been detected from the respective front-end search regions SR of the first camera 10A in the forward image (S190). If the control unit 24 determines that the targets 50 are not shown in the front-end search regions SR of the first camera 10A in the forward image, and the detection has been unsuccessful (NO at S190), calibration proceeds to step S240 described later. The situation where the targets 50 are not shown (cannot be detected) in the respective front-end search regions SR of the first camera 10A in the forward image, may be a situation, for example, where the vehicle 5 has not reached the position where the targets 50 can be imaged.

If the control unit 24 determines that the targets 50 have been detected from the respective front-end search regions SR of the first camera 10A in the forward image (YES at S190), calibration proceeds to step S200.

The control unit 24 detects the target 50 from the forward search region of the fourth camera 10D in the left image captured at step S170 (S200). In the detection, the control unit 24 determines whether a target 50 is shown in the forward search region of the fourth camera 10D in the left image. The process of determining whether a target 50 is shown is similar to step S180 described above. Therefore, the detailed descriptions here are omitted.

The control unit 24 determines whether a target 50 has been detected from the forward search region of the fourth camera 10D in the left image (S210). If the control unit 24 determines that no target 50 is shown in the forward search region of the fourth camera 10D in the left image, and thus the detection has been unsuccessful (NO at S210), calibration proceeds to step S240 described later. If the control unit 24 determines that a target 50 has been detected from the forward search region of the fourth camera 10D in the left image (YES at S210), calibration proceeds to step S220.

The control unit 24 detects a target 50 from the forward search region of the second camera 10B in the right image captured at S170 (S220). In the detection, the control unit 24 determines whether a target 50 is shown in the forward search region of the second camera 10B in the right image. The process of determining whether a target 50 is shown is similar to step S180 described above. Therefore, the detailed descriptions here are omitted.

The control unit 24 determines whether a target 50 has been detected from the forward search region of the second camera 10B in the right image (S230). If the control unit 24 determines that a target 50 has been detected from the forward search region of the second camera 10B in the right image (YES at S230), calibration proceeds to step S260 described later referring to FIG. 7. If the control unit 24 determines that no target 50 is shown in the forward search region of the second camera 10B in the right image, and thus the detection has been unsuccessful (NO at S230), calibration proceeds to step S240.

The control unit 24 determines whether a first predetermined time has elapsed from the start of step S160 (S240). The first predetermined time is defined to be a duration of time from when the vehicle 5 starts traveling at a speed of not more than the speed threshold from a point specified before the two targets 50, until when the front end of the vehicle 5 passes between the two targets 50.

If the control unit 24 determines that the first predetermined time has elapsed (YES at S240), calibration is terminated. If the first predetermined time has elapsed, it means that the front end of the vehicle 5 has passes between the two targets 50 as mentioned above. Therefore, there is no longer any possibility of detecting the targets 50 from the captured image. Specifically, there is no possibility of detecting the targets 50 from the front-end search regions SR of the first camera 10A in the forward image, and from the forward search regions of the second and fourth cameras 10B and 10D in the respective right and left images. Thus, in the present embodiment, if there is no longer any possibility of detecting the targets 50, calibration is terminated and then re-executed.

If the first predetermined time is determined not to have elapsed (NO at S240), the control unit 24 outputs a second error signal to the display device 40 (S250). The display device 40 then displays predetermined error information based on the second error signal, to notify the worker of the occurrence of an error. The second error signal indicates that the targets 50 are not shown in at least one of the forward, left and right images (the targets 50 cannot be detected from the captured images). The display device 40 displays the predetermined error information, based on the inputted second error signal to notify the worker of the occurrence of an error. Specifically, the display device 40 displays error information notifying that the targets 50 are not shown in at least one of the forward, left and right images.

After outputting the second error signal to the display device 40, the control unit 24 re-executes step S160. Thus, the control unit 24 outputs an imaging command again to the first camera 10A (S160) and repeats step S170 onward.

As shown in FIG. 7, if a target 50 is detected from the forward search region of the first camera 10A in the right image (YES at S230), the control unit 24 determines a rear-end search region in a rearward image (hereinafter is referred to as "rear-end search region of the third camera 10c") (S260).

Figure 5B:
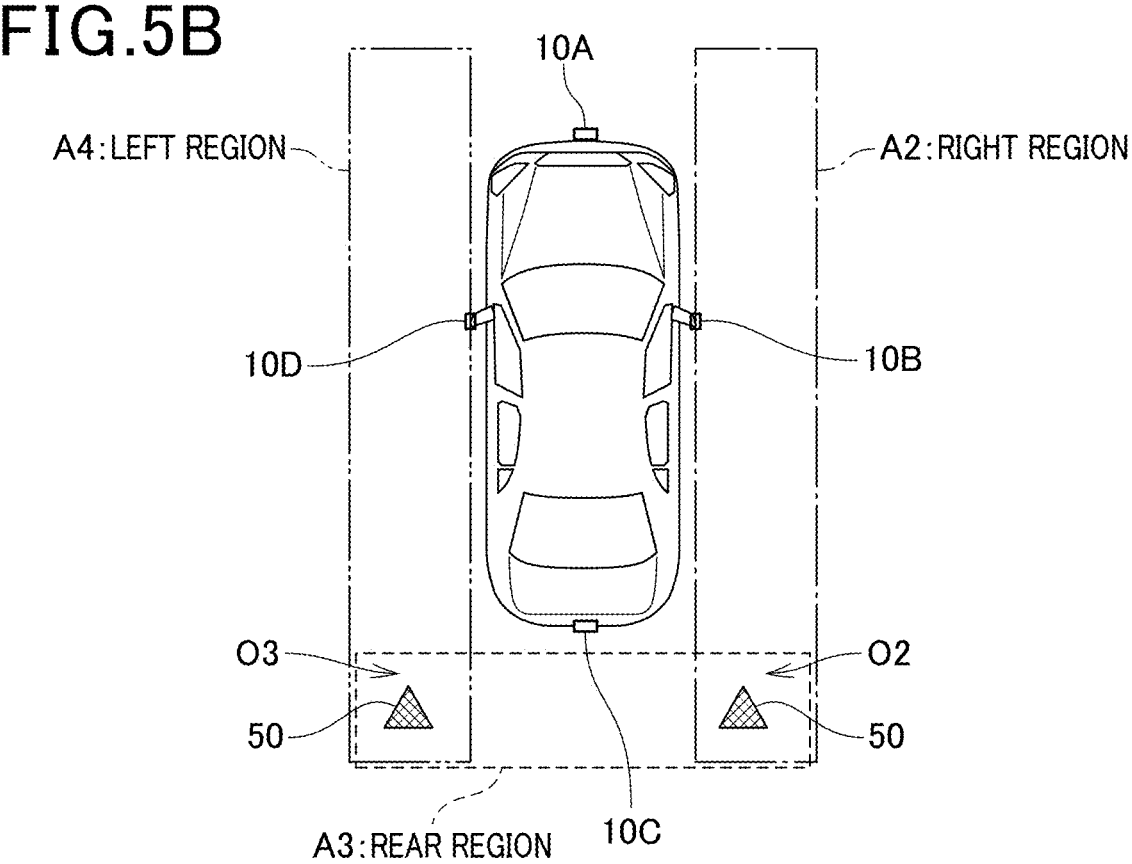
FIG. 5B is a diagram illustrating a situation where an image is captured after the vehicle has passed between two imaging targets.

The rearward image is an image of the rear region A3, shown in FIG. 5B, captured by the third camera 10C. The rear-end search region of the third camera 10C is a region as set forth below. Specifically, after the rear end of the vehicle 5 has passed between the two targets 50, the third camera 10C captures an image of the rear region A3. The rear region A3 is a target region in the obtained rearward image, for determining whether the targets 50 are shown therein.

In the present embodiment, the rear-end search region of the third camera 10C is provided to each of the right and left ends of the rearward image. Specifically, the control unit 24 executes step S260 to determine rear-end search regions of the third camera 10C in predetermined areas of the respective overlap regions O2 and O3 where the right and left images each overlap the rearward image. That is, the rear-end search regions of the third camera 10C determined at step S260 are highly likely to show the targets 50.

Then, the control unit 24 determines rearward search regions in the right and left images (hereinafter is referred to as "rearward search region of the second camera 10B" and "rearward search region of the fourth camera 10D") (S270). Rearward search regions of the second and fourth cameras 10B and 10D correspond to regions as set forth below. In particular, after the rear end of the vehicle 5 has passed between the two targets 50, the second camera 10B captures an image of the right region A2, and the fourth camera 10D captures an image the left region A4. The right and left regions A2 and A4 correspond to target regions in the obtained right and left images, for determining whether the targets 50 are shown therein.

In the present embodiment, the rearward search regions of the second and fourth cameras 10B and 10D are determined to be respective end portions behind the vehicle in the right and left images. Specifically, the control unit 24 executes step S270 to determine the rearward search regions of the second and fourth cameras 10B and 10D in predetermined areas of the respective overlap regions O2 and O3 where the right and left images each overlap the forward image.

Then, the control unit 24 outputs an imaging command for capturing an image to the third camera 10C (S280). The third camera 10C then captures a rearward image according to the imaging command. The third camera 10C outputs the captured rearward image to the control unit 24.

The control unit 24 outputs the imaging command for capturing an image to the second and fourth cameras 10B and 10D (S290). The second camera 10B then captures a right image according to the imaging command. The second camera 10B outputs the captured right image to the control unit 24. Similarly, the fourth camera 10D captures a left image and outputs the captured left image to the control unit 24.

Then, the control unit 24 detects the targets 50 from the rear-end search regions (regions provided to right and left end portions) of the third camera 10C, in the rearward image captured at step S280 (S300). In the detection, the control unit 24 determines whether a target 50 is shown in the rear-end search region of the third camera 10C in the rearward image. The process of determining whether a target 50 is shown is similar to step S180 described above. Therefore, the detailed descriptions here are omitted.

The control unit 24 determines whether the target 50 has been detected from the rear-end search region of the third camera 10C in the rearward image (S310). As the result, if the control unit 24 determines that the detection is failed because the target 50 is not captured within the rear-end search region of the third camera 10C in the rearward image (S310: NO), the calibration processing proceeds to the processing at the after-mentioned step S360. The situation where the targets 50 are not shown (cannot be detected) in the respective rear-end search regions of the third camera 10C in the rearward image, may be a situation, for example, where the rear-end of the vehicle 5 has not yet passed between the targets 50.

If the control unit 24 determines that the target 50 has been successfully detected from the rear-end search region of the third camera 10C in the rearward image (YES at S310), calibration proceeds to step S320.

The control unit 24 detects the target 50 from the rearward search region of the fourth camera 10D, in the left image captured at step S290 (S320). In the detection, the control unit 24 determines whether the target 50 is shown in the rearward search region of the fourth camera 10D in the left image. The process of determining whether a target 50 is shown is similar to step S180 described above. Therefore, the detailed descriptions here are omitted.

The control unit 24 determines whether the target 50 has been detected from the rearward search region of the fourth camera 10D in the left image (S330). If the control unit 24 determines that the target 50 is not shown in the rearward search region of the fourth camera 10D in the left image, and the detection has been unsuccessful (NO at S330), calibration proceeds to step S360 described later. If the control unit 24 determines that the target 50 has been successfully detected from the rearward search region of the four camera 10D in the left image (YES at S330), calibration proceeds to step S340.

The control unit 24 detects the target 50 from the rearward search region of the second camera 10B in the right image captured at step S290 (S340). In the detection, the control unit 24 determines whether the target 50 is shown in the rearward search region of the second camera 10B in the right image. The process of determining whether a target 50 is shown is similar to step S180 described above. Therefore, the detailed descriptions here are omitted.

The control unit 24 determines whether a target 50 has been detected from the rearward search region of the second camera 10B in the right image (S350). If the control unit 24 determines that a target 50 has been detected from the rearward search region of the second camera 10B in the right image (YES at S350), calibration proceeds to step S380 described later. If the control unit 24 determines that no target 50 is shown in the rearward search region of the second camera 10B in the right image, and thus the detection has been unsuccessful (NO at S350), calibration proceeds to step S360.

The control unit 24 determines whether a second predetermined time has elapsed from the start of step S280 (S360). The second predetermined time is defined to be a duration of time from when the front end of the vehicle 5 has reached the position between the two targets 50, until when the rear end of the vehicle 5 traveling at a speed of not more than the speed threshold passes between the two targets 50.

If the control unit 24 determines that the second predetermined time has elapsed (YES at S360), calibration is terminated. If the second predetermined time has elapsed, it means that the rear end of the vehicle 5 has passes between the two targets 50 as mentioned above. Therefore, there is no longer any possibility of detecting the targets 50 from the captured image. Specifically, there is no possibility of detecting the targets 50 from the rear-end search regions of the third camera 10C in the rearward image, and from the rearward search regions of the second and fourth cameras 10B and 10D in the respective right and left images. Thus, in the present embodiment, if there is no longer any possibility of detecting the targets 50, calibration is terminated and then re-executed.

If the second predetermined time is determined not to have elapsed (NO at S360), the control unit 24 outputs a third error signal to the display device 40 (S370). The display device 40 then displays predetermined error information based on the third error signal to notify the worker of the occurrence of an error. The third error signal indicates that the targets 50 are not shown in at least one of the rearward, left and right images (the targets 50 cannot be detected from the captured images). The display device 40 displays error information notifying that the targets 50 are not shown in at least one of the rearward, left and right images.

After outputting the third error signal to the display device 40, the control unit 24 re-executes step S280. Thus, the control unit 24 outputs an imaging command again to the third camera 10C (S280) and repeats step S290 onward.

If the targets 50 are detected from the search regions of the respective captured images (YES at S350), the pitch Θ, the roll Φ and the vertical position z are identified for each of the plurality of cameras 10, among the attitude parameters of the cameras. Then, the control unit 24 stores the identified attitude parameters (pitch Θ, roll Φ and vertical position z) in the parameter storage 22 (S380).

The method for identifying the pitch Θ, the roll Φ, and the vertical position z is well known as described in, for example, JP 5299231 B. Therefore, the detailed descriptions here are omitted.

In the present embodiment, the attitude parameters (pitch Θ, roll Φ vertical position z) may be identified at step S380 through the following process. Specifically, the control unit 24 may perform projective transformation for the captured images. In the present embodiment, the projective transformation refers to bird's-eye-view conversion. The control unit 24 identifies the pitch Θ and roll Φ of each of the cameras 10A, 10B, 10C and 10D such that the shape of each target 50 shown in the image after projective transformation (hereinafter is referred to as "bird's-eye-view conversion" for convenience sake) agrees with the shape of the actual target 50. The control unit 24 also identifies the vertical position z of each of the cameras 10A, 10B, 10C and 10D such that the size of the target 50, whose shape has agreed with the actual target 50, shown in the image after bird's-eye-view conversion agrees with the size of the actual target 50.

Then, the control unit 24 identifies the x-coordinate, the y-coordinate, and the yaw Ψ of each of the plurality of cameras 10 among the attitude parameters of the cameras. Then, the control unit 24 stores the identified attitude parameters (x-coordinate, y-coordinate and yaw Ψ) in the parameter storage 22 (S390).

In the present embodiment, the attitude parameters (x-coordinate, y-coordinate and yaw Ψ) may be identified at step S390 through the following process. The control unit 24 may execute [Procedure 1] for identifying the coordinate at a representative point of a target 50 shown in each captured image. The representative point corresponds to a representative point of a target 50 shown in each captured image. In the present embodiment, a gravity center is taken to be the representative point.

Then, the control unit 24 may execute [Procedure 2] for calculating a virtual link structure that is consistent with the coordinates at the respective representative points of the targets 50, using the coordinates identified in [Procedure 1]. The virtual link structure is formed of line segments virtually linking between the representative points of the targets 50 shown in the captured images.

The control unit 24 may execute [Procedure 3] for identifying a link angle α that minimizes the value of an evaluation function in the virtual link structure calculated in [Procedure 2]. Then, the control unit 24 may execute [Procedure 4] for identifying the x-coordinate, the y-coordinate, and the yaw Ψ of each of the plurality of cameras 10 among the attitude parameters of the cameras, using the link angle α identified in [Procedure 3].

In [Procedure 1], the process described in JP 5299231 B may be used, for example, as a method of identifying the coordinate at a representative point of a target 50 shown in each captured image.

Figure 8:
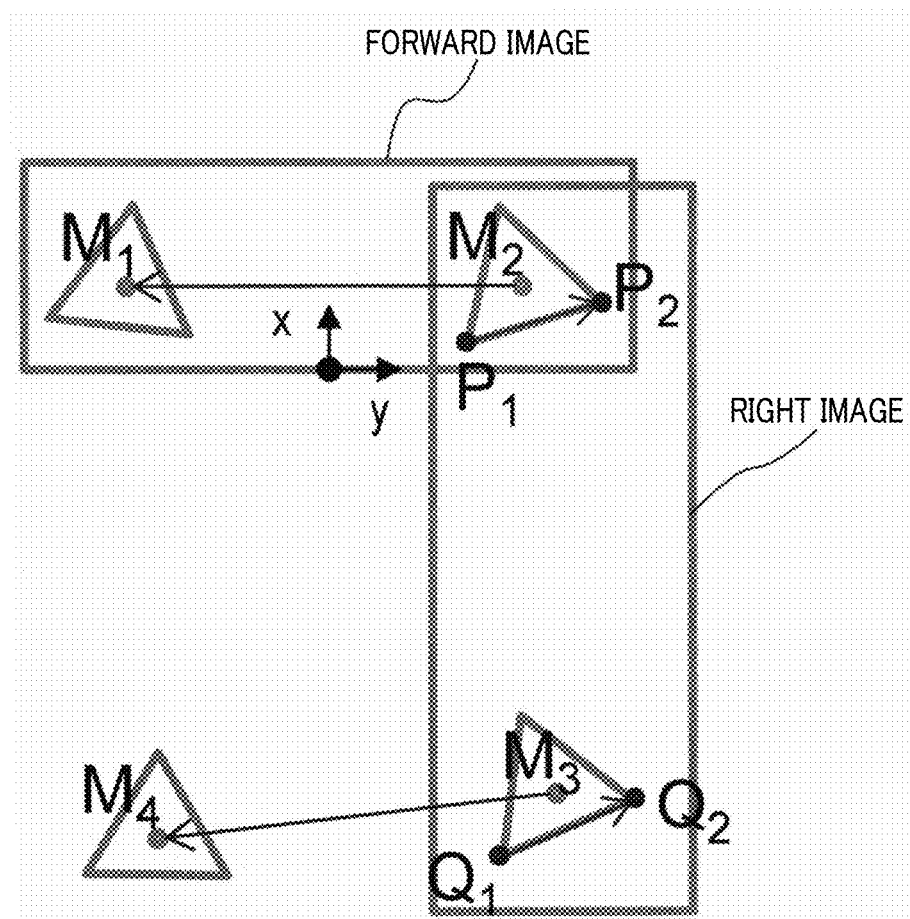
FIG. 8 is a diagram illustrating how a link structure is identified.

Referring to FIG. 8, a detailed description is provided below. The following description is provided based on a premise set forth below. Herein, among the representative points of the targets 50 shown in the captured images, $M_1$ indicates a representative point of a target 50 shown in the images captured by both the first and fourth cameras 10A and 10D before the front end of the vehicle 5 reaches the point between the two targets 50. Among the representative points of the targets 50 shown in the captured images, $M_2$ indicates a representative point of a target 50 shown in the images captured by both the first and second cameras 10A and 10B before the front end of the vehicle 5 reaches the point between the two targets 50.

Among the representative points of the targets 50 shown in the captured images, $M_3$ indicates a representative point of a target 50 shown in the images captured by both the third and second cameras 10C and 10B after the rear end of the vehicle 5 has passed between the two targets 50. Among the representative points of the targets 50 shown in the captured images, $M_4$ indicates a representative point of a target 50 shown in the images captured by both the third and fourth cameras 10C and 10D after the rear end of the vehicle 5 has passed between the two targets 50.

In the calibration according to the present embodiment, $M_4$ is calculated by the following Formulas (1) to (6). It should be noted that $M_4$ is derived lastly according to the time axis in the process of calculating $M_1$ to $M_4$. That is, $M_4$ is derived lastly after that $M_1$ to $M_3$ have been calculated, in the process of calculating $M_1$ to $M_4$.

[Math. 1]

$$\vec{M_4} = \vec{M_3} + \vec{M_3 M_4} \quad (1)$$

The vectors $M_4$ and $M_3$ in Formula (1) are each defined vectors to be oriented from an origin of a specific camera among the plurality of cameras 10 toward $M_4$ and $M_3$. The vector $M_3 M_4$ is defined a vector to be oriented from $M_3$ toward $M_4$.

In the present embodiment, two targets 50 are disposed with the positional relationship therebetween being fixed. Therefore, the positional relationship between $M_3$ and $M_4$ is equal to the positional relationship between $M_1$ and $M_2$. Accordingly, Formula (1) can be converted into the following Formula (2).

[Math. 2]

$$\vec{M_4} = \vec{M_3} + \begin{pmatrix} \cos(\delta) & -\sin(\delta) \\ \sin(\delta) & \cos(\delta) \end{pmatrix} \vec{M_2 M_1} \quad (2)$$

The reference sign δ indicates an angle formed between the vectors $M_3 M_4$ and $M_2 M_1$. The vector $M_2 M_1$ is oriented from $M_2$ toward $M_1$.

When the vector $M_4$ is divided into an x component and a y component, the above Formula (2) is expressed by the following Formulas (3) and (4).

[Math. 3]

$$M_{4x} = M_{3x} + \cos(\delta)(M_{1x} - M_{2x}) - \sin(\delta)(M_{1y} - M_{2y}) \quad (3)$$

$$M_{4y} = M_{3y} + \sin(\delta)(M_{1x} - M_{2x}) + \cos(\delta)(M_{1y} - M_{2y}) \quad (4)$$

For a target 50 shown in a captured image before the front end of the vehicle 5 reaches the position between the two targets 50, two vertices $P_1$ and $P_2$ of the target 50 are expressed by a vector $P_1 P_2$. For the target 50 disposed at the same position as the above target 50 and shown in a captured image after the rear end of the vehicle 5 has passed between the two targets 50, two vertices $Q_1$ and $Q_2$ of the target 50 are expressed by a vector $Q_1 Q_2$.

The reference sign δ indicates an angle formed between the vectors $P_1 P_2$ and $Q_1 Q_2$. Accordingly, cos (δ) is expressed by the following Formula (5) and sin (δ) is expressed by the following Formula (6). It should be noted that that the reference sign L in Formula (5) indicates a distance between two vertices in one target 50.

[Math. 4]

$$\cos(\delta) = \frac{\overrightarrow{P_1P_2} \cdot \overrightarrow{Q_1Q_2}}{|\overrightarrow{P_1P_2}||\overrightarrow{Q_1Q_2}|} = \frac{(P_{2x} - P_{1x})(Q_{2x} - Q_{1x}) + (P_{2y} - Q_{1y})}{L^2} \quad (5)$$

$$\sin(\delta) = \sqrt{(1 - \cos^2(\delta))} \quad (6)$$

By substituting cos (δ) expressed by Formula (5) and sin (δ) expressed by Formula (6) into Formula (2), $M_4$ can be derived without calculating a trigonometric function.

In the present embodiment, [Procedure 2], [Procedure 3] and [Procedure 4] may be executed using a well-known method. An example of [Procedure 2], [Procedure 3] and [Procedure 4] may correspond to the method described in JP 5299231 B.

With the processing described above, the control unit 24 terminates the calibration for identifying the attitude parameters (pitch Θ, roll Φ, yaw Ψ, x-coordinate, y-coordinate and vertical position z) of the plurality of cameras 10.

Advantageous Effects of the Embodiment

Calibration according to the present embodiment, which is one of the technical modes of the present disclosure, may achieve the following advantageous effects.

According to the calibration of the present embodiment, images captured by the first, second and fourth cameras 10A, 10B and 10D are acquired before the vehicle 5 passes between the two targets 50, for use in identifying attitude parameters. According to the calibration, images captured by the second, third and fourth cameras 10B, 10C and 10D are acquired after the vehicle 5 has passed between the two targets 50, for use in identifying attitude parameters.

That is, according to the calibration of the present embodiment, images used for calibration are acquired using a simple method of allowing the vehicle 5 to travel by a predetermined distance (for a predetermined time).

According to the calibration, information used for calibration is derived from the images captured by the cameras 10. Other information, such as the rotation angle of the vehicle 5, is not used.

That is, according to the calibration of the present embodiment, calibration can be carried out in the absence of a rotation angle sensor from the vehicle 5.

Thus, the technique of the present disclosure further enhances degrees of freedom of calibration in the technique of deriving attitude parameters of the cameras 10.

According to the calibration of the present embodiment, if the targets 50 cannot be detected from the captured images, a notification is given accordingly.

That is, according to the calibration, non-acquisition of images to be used for calibration is notified to the worker using the calibration device 20. Thus, the worker can recognize the insufficiency of the information to be used for calibration and can promptly deal with the problem.

According to the calibration of the present embodiment, a predetermined specified search region is determined for each captured image. According to the calibration, the search region determined for each captured image is searched through to determine whether the targets 50 are shown therein (whether the targets 50 are included therein).

Thus, the calibration of the present embodiment reduces the amount of processing involved in determining whether a target 50 is shown in each captured image.

According to the calibration of the present embodiment, a determination is made as to whether a target 50 is shown in the images captured by the plurality of cameras 10, when the traveling speed is not more than the predetermined speed (speed threshold).

That is, captured images are acquired for calibration when the vehicle 5 travels at a low speed. Thus, the calibration of the present embodiment improves calibration accuracy.

According to the calibration of the present embodiment, when the traveling speed is faster than the predetermined speed (higher than the speed threshold), a notification is given accordingly. Thus, the user (worker) of the calibration device 20 of the present embodiment can recognize that accurate calibration cannot be performed due to the traveling speed being lower than the predetermined speed, and can deal with the problem promptly.

According to the calibration of the present embodiment, the representative point $M_4$ of the target 50 is derived at step S390 without calculating a trigonometric function.

Thus, the calibration of the present embodiment reduces the amount of processing involved in deriving the representative point $M_4$ of a target 50 shown in the captured image.

Other Embodiments

An embodiment as a technical mode of the present disclosure has been described so far. However, the present disclosure is not limited to the above embodiment. The technique of the present disclosure can be implemented in various modes within the scope not departing from the spirit of the present disclosure.

In the above embodiment, the vehicle 5 passes between the two targets 50 that are disposed with a distance therebetween being larger than the width of the vehicle 5, and images captured during the passage are used for calibration. However, images to be used for calibration are not limited to such images.

Images used for identifying attitude parameters may be captured through the following method. For example, the images of the targets 50 ahead of the vehicle 5 may be captured by the first, second and fourth cameras 10A, 10B and 10D in a state where the vehicle 5 is stationary. Further, after moving the targets 50 ahead of the vehicle 5 rearward for location behind the vehicle, the images of the targets 50 behind the vehicle 5 may be captured by the second, third and fourth cameras 10B, 10C and 10D in a state where the vehicle 5 is stationary. When the targets 50 are moved from ahead of the vehicle 5 to behind thereof, it is preferable that the positional relationship between the two targets 50 remains unchanged.

Use of the method described above for acquiring images used for identifying attitude parameters can minimize the area of the working range (the size of the work space) for identifying attitude parameters. Specifically, firstly, images of the targets 50 ahead of the vehicle 5 are captured by the first, second and fourth cameras 10A, 10B and camera 10D. Then, the vehicle 5 is advanced to the position where the targets 50 are disposed. Subsequently, the targets 50 will be disposed behind the vehicle 5. Then, images of the targets 50 behind the vehicle 5 are captured by the second, third and fourth cameras 10B, 10C and 10D. This way of image capture can readily assure a horizontal work space used for specifying the attitude parameters of the cameras during a manufacturing stage of the vehicle 5 or during a maintenance stage at the car dealers.

In the embodiment described above, traveling speed of the vehicle 5 is confirmed during calibration (steps S110 to S130). The steps of confirming the traveling speed of the vehicle 5 may be omitted from the calibration.

It should be noted that the any mode with partial omission of the configuration of the aforementioned embodiment should be an embodiment of the technical mode of the present disclosure. Further, the mode that is a configuration obtained by appropriately combining the aforementioned embodiment with a modification should also be an embodiment of the technical mode of the present disclosure. Further, any mode encompassed by the technical idea (technical scope) as defined by the object of the present disclosure should also be an embodiment of the technical mode of the present disclosure.

REFERENCE SIGNS LIST

1 . . . Calibration system
5 . . . Vehicle
10 . . . Camera (10A: First camera, 10B: Second camera, 10C: Third camera, 10D: Fourth camera)
14 . . . Input device
20 . . . Calibration device
22 . . . Parameter storage
24 . . . Control unit
26 . . . ROM
28 . . . RAM
30 . . . CPU
40 . . . Display device
50 . . . Imaging target

The invention claimed is:

1. A calibration device identifying attitude parameters of a plurality of cameras mounted to a vehicle, wherein:
   the plurality of cameras are mounted to the vehicle so as to capture images of specified regions different from each other and defined around the vehicle, each specified region having overlap regions where the specified region partially overlap with another specified region;
   the plurality of cameras include a first camera capturing an image in a forward direction of the vehicle, a second camera capturing an image in a rightward direction of the vehicle, a third camera capturing an image in a rearward direction of the vehicle, and a fourth camera capturing an image in a leftward direction of the vehicle;
   the calibration device comprises:
   an image acquisition unit acquiring images captured by the plurality of cameras;
   a first identification unit acting on imaging targets with given shape and size to perform projective transformation for the imaging targets shown in the overlap regions of each image acquired by the image acquisition unit and identify a roll, a pitch and a vertical position among the attitude parameters of each of the plurality of cameras so that conversion results are consistent with the shape and size of the imaging target, the roll being a rotation angle of each camera about a lens center axis of the camera, the pitch being a rotation angle of each camera about a horizontal axis of the camera, the vertical position being a coordinate in a height direction of the vehicle; and
   a second identification unit acting on a virtual link structure to identify an x-coordinate, a y-coordinate and a yaw among the attitude parameters of each of the plurality of cameras so that one link angle of the virtual link structure is minimized, the x-coordinate being a coordinate in a longitudinal direction of the vehicle, the y-coordinate being a coordinate in a lateral direction of the vehicle, the yaw being a rotation angle of the vehicle about an axis perpendicular to a horizontal plane, the virtual structure being formed of line segments serving as links and virtually connecting representative points of the imaging targets shown in the images acquired by the image acquisition unit, where the representative points of the imaging targets located at the same position and shown in the overlap regions of different images are permitted to coincide with each other;
   the image acquisition unit comprises:
   a first acquisition unit acquiring images of the imaging targets ahead of the vehicle captured by the first camera, the second camera, and the fourth camera; and
   a second acquisition unit acquiring images of the imaging targets behind the vehicle captured by the second camera, the third camera, and the fourth camera, these images being different from the images acquired by the first acquisition unit;
   and
   the first identification unit and the second identification unit use images acquired by the first acquisition unit and images acquired by the second acquisition unit, as images acquired by the image acquisition unit to identify attitude parameters of each of the plurality of cameras.

2. The calibration device according to claim 1, wherein the imaging target is disposed in a space larger than the vehicle width of the vehicle:
   the first acquisition unit acquires images captured by the first camera, the second camera, and the fourth camera, before the vehicle passes between the imaging targets;
   the second acquisition unit acquires images captured by the second camera, the third camera, and the fourth camera, after the vehicle has passed between the imaging targets.

3. The image acquisition unit according to claim 1, wherein the image acquisition unit comprises:
   a first determination unit determining whether the imaging target is shown in each image captured by the plurality of cameras; and
   the first notification unit notifying that the imaging target is not shown when the first determination unit determines that the imaging target is not shown.

4. The calibration device according to claim 3, wherein:
   the calibration device comprises a range determination unit determining a search region that is a target region in which a determination is made as to whether the imaging target is shown in each image captured by the plurality of cameras; and
   the first determination unit determines whether the imaging target is not shown in the search region determined by the range setting unit.

5. The calibration device according to claim 3, wherein:
   the calibration device comprises:
   a speed acquisition unit acquiring a traveling speed of the vehicle; and
   a second determination unit determining whether a traveling speed acquired by the speed acquisition unit is not more than a predetermined speed threshold;
   and
   the first determination unit determines whether the imaging target is shown in each image captured by the plurality of cameras, when the second determination unit determines that the traveling speed is not more than the speed threshold.

6. The calibration device according to claim 5, wherein: the calibration device comprises a second notification unit notifying that the traveling speed is greater than the speed threshold, when the second determination unit determines that the traveling speed is greater than the speed threshold.

7. The calibration device according to claim 1, wherein: the positional relationship between the imaging targets in the image acquired by the first acquisition unit is the same as the positional relationship between the imaging targets in the image acquired by the second acquisition unit; and the second identification unit:
sequentially identifies representative points of the imaging targets shown in the overlap regions of respective images acquired by the image acquisition unit;
makes the identified representative points coincide with the imaging targets located at the corresponding positions to form the virtual link structure; and
when the representative points of the most recent imaging targets are identified along a time axis among the representative points of the imaging targets shown in the overlap regions, the x-coordinate, the y-coordinate, and the yaw of the attitude parameters of the plurality of cameras are identified based on the representative points of the most recent imaging targets.

8. A calibration method performed by a calibration device identifying attitude parameters of a plurality of cameras mounted to a vehicle, wherein:
the plurality of cameras are mounted to the vehicle so as to capture images of specified regions different from each other and defined around the vehicle, each specified region having overlap regions where the specified region partially overlap with another specified region;
the plurality of cameras include a first camera capturing an image in a forward direction of the vehicle, a second camera capturing an image in a rightward direction of the vehicle, a third camera capturing an image in a rearward direction of the vehicle, and a fourth camera capturing an image in a leftward direction of the vehicle;
the calibration method comprises:
an image acquisition step of acquiring images captured by the plurality of cameras;
a first identification step of acting on imaging targets with given shape and size to perform projective transformation for the imaging targets shown in the overlap regions of each image acquired by the image acquisition step and identify a roll, a pitch and a vertical position among the attitude parameters of each of the plurality of cameras so that conversion results are consistent with the shape and size of the imaging target, the roll being a rotation angle of each camera about a lens center axis of the camera, the pitch being a rotation angle of each camera about a horizontal axis of the camera, the vertical position being a coordinate in a height direction of the vehicle; and
a second identification step of acting on a virtual link structure to identify an x-coordinate, a y-coordinate and a yaw among the attitude parameters of each of the plurality of cameras so that one link angle of the virtual link structure is minimized, the x-coordinate being a coordinate in a longitudinal direction of the vehicle, the y-coordinate being a coordinate in a lateral direction of the vehicle, the yaw being a rotation angle of the vehicle about an axis perpendicular to a horizontal plane, the virtual structure being formed of line segments serving as links and virtually connecting representative points of the imaging targets shown in the images acquired by the image acquisition step, where the representative points of the imaging targets located at the same position and shown in the overlap regions of different images are permitted to coincide with each other;

the image acquisition step comprises:
a first acquisition step of acquiring images of the imaging targets ahead of the vehicle captured by the first camera, the second camera, and the fourth camera; and
a second acquisition step of acquiring images of the imaging targets behind the vehicle captured by the second camera, the third camera, and the fourth camera, these images being different from the images acquired by the first acquisition step; and
the first identification step and the second identification step use images acquired through the first acquisition step and images acquired through the second acquisition step, as images acquired by the image acquisition step to identify attitude parameters of each of the plurality of cameras.

9. A non-transitory computer-readable storage medium containing thereon a program comprising instructions, causing a computer to execute a display control method for identifying attitude parameters of a plurality of cameras mounted to a vehicle by a calibration device, wherein:
the plurality of cameras are mounted to the vehicle so as to capture images of specified regions different from each other and defined around the vehicle, each specified region having overlap regions where the specified region partially overlap with another specified region;
the plurality of cameras include a first camera capturing an image in a forward direction of the vehicle, a second camera capturing an image in a rightward direction of the vehicle, a third camera capturing an image in a rearward direction of the vehicle, and a fourth camera capturing an image in a leftward direction of the vehicle;
the computer is permitted to function as:
an image acquisition step of acquiring images captured by the plurality of cameras;
a first identification step of acting on imaging targets with given shape and size to perform projective transformation for the imaging targets shown in the overlap regions of each image acquired by the image acquisition step and identify a roll, a pitch and a vertical position among the attitude parameters of each of the plurality of cameras so that conversion results are consistent with the shape and size of the imaging target, the roll being a rotation angle of each camera about a lens center axis of the camera, the pitch being a rotation angle of each camera about a horizontal axis of the camera, the vertical position being a coordinate in a height direction of the vehicle; and
a second identification step of acting on a virtual link structure to identify an x-coordinate, a y-coordinate and a yaw among the attitude parameters of each of the plurality of cameras so that one link angle of the virtual link structure is minimized, the x-coordinate being a coordinate in a longitudinal direction of the vehicle, the y-coordinate being a coordinate in a lateral direction of the vehicle, the yaw being a rotation angle of the vehicle about an axis perpendicular to a horizontal plane, the virtual structure being formed of line segments serving as links and virtually connecting representative points of the imaging targets shown in the images acquired by the image acquisition step, where the representative points of the imaging targets located at the same position and shown in the overlap regions of different images are permitted to coincide with each other;

the image acquisition step comprises:
- a first acquisition step of acquiring images of the imaging targets ahead of the vehicle captured by the first camera, the second camera, and the fourth camera; and
- a second acquisition step of acquiring images of the imaging targets behind the vehicle captured by the second camera, the third camera, and the fourth camera, these images being different from the images acquired by the first acquisition step;

and the first identification step and the first identification step use images acquired by the first acquisition step and images acquired by the second acquisition step, as images acquired by the image acquisition step to identify attitude parameters of each of the plurality of cameras.

* * * * *